United States Patent
Zhang et al.

(10) Patent No.: US 10,378,537 B2
(45) Date of Patent: Aug. 13, 2019

(54) SYSTEM FOR DETECTING FAILURE LOCATION IN A PUMP

(71) Applicant: Caterpillar Inc., Peoria, IL (US)

(72) Inventors: Yanchai Zhang, Dunlap, IL (US); Venkata Bhagavathi Dandibhotla, Peoria, IL (US); Zhijun Cai, Springfield, IL (US); Zhaoxu Dong, Dunlap, IL (US); Xuefei Hu, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 254 days.

(21) Appl. No.: 15/287,416

(22) Filed: Oct. 6, 2016

(65) Prior Publication Data

US 2018/0100496 A1    Apr. 12, 2018

(51) Int. Cl.
| | |
|---|---|
| *F04B 51/00* | (2006.01) |
| *F04B 1/00* | (2006.01) |
| *F04B 53/10* | (2006.01) |
| *G01M 3/26* | (2006.01) |

(52) U.S. Cl.
CPC ............... *F04B 51/00* (2013.01); *F04B 1/00* (2013.01); *F04B 53/10* (2013.01); *G01M 3/26* (2013.01); *F04B 2201/0201* (2013.01); *F04B 2205/04* (2013.01)

(58) Field of Classification Search
CPC .. F04B 51/00; F04B 1/00; F04B 53/10; F04B 2201/0201; F04B 2205/04; G01M 3/26
USPC ...................................................... 73/40.5 R
See application file for complete search history.

(56) References Cited

U.S. PATENT DOCUMENTS

| | | | |
|---|---|---|---|
| 4,489,551 A | | 12/1984 | Watanabe |
| 4,705,459 A | * | 11/1987 | Buisine ................... F04B 51/00 |
| | | | 137/554 |
| 7,069,183 B2 | | 6/2006 | Schluecker |
| 7,401,500 B2 | | 7/2008 | Wago |
| 8,366,402 B2 | * | 2/2013 | St. Michel .......... E21B 47/0008 |
| | | | 417/53 |
| 8,554,494 B2 | | 10/2013 | Adnan |
| 8,601,874 B2 | | 12/2013 | Kyllingstad |
| 8,979,505 B2 | | 3/2015 | Pessin |

(Continued)

FOREIGN PATENT DOCUMENTS

EP         0264148 B1    4/1991

*Primary Examiner* — Eric S. McCall
*Assistant Examiner* — Timothy P Graves
(74) *Attorney, Agent, or Firm* — Miller, Matthias & Hull

(57) ABSTRACT

A method for detecting a leak in a pump comprises: monitoring discharge pressure time domain signals of the pump; monitoring piston position time domain signals for each piston of a plurality of pistons; filtering the monitored discharge pressure time domain signals and the monitored piston position time domain signals of each piston of the plurality of pistons via a band pass filter; determining, at each pump revolution for each piston, a sum of product of the filtered discharge pressure time domain signals and the filtered piston position time domain signals; determine, at each pump revolution for each piston, an absolute value of each sum; determining, at each pump revolution, a largest absolute value of the determined absolute values; determining a corresponding piston of the plurality of pistons associated with the largest absolute value; and determining a cylinder of the pump associated with the determined corresponding piston as leaking.

20 Claims, 4 Drawing Sheets

(56) References Cited

U.S. PATENT DOCUMENTS

| | | | |
|---|---|---|---|
| 2004/0167738 A1* | 8/2004 | Miller | F04B 51/00 |
| | | | 702/114 |
| 2006/0162439 A1* | 7/2006 | Du | F15B 19/005 |
| | | | 73/168 |
| 2007/0140869 A1* | 6/2007 | St. Michel | E21B 47/0008 |
| | | | 417/53 |
| 2010/0300683 A1* | 12/2010 | Looper | E21B 21/06 |
| | | | 166/250.01 |
| 2013/0280106 A1* | 10/2013 | Kyllingstad | F04B 51/00 |
| | | | 417/53 |
| 2013/0283773 A1* | 10/2013 | Hague | F04B 49/106 |
| | | | 60/328 |

* cited by examiner

SYSTEM FOR DETECTING FAILURE LOCATION IN A PUMP

TECHNICAL FIELD

The present disclosure relates generally to pumps and, more particularly, relates to a system for detecting failure location in such pumps.

BACKGROUND

Generally, positive displacement pumps may be utilized to pump fluids in high pressure applications for a variety of industrial settings such as, but not limited to, hydraulic fracturing, cementing, coil tubing, and water jet cutting. Such pumps may include a reciprocating piston that draws fluid into a pump chamber through a suction valve as the piston moves in one direction and discharges the fluid from the pump chamber via a discharge valve as the piston moves in an opposite direction. During operation, such pump components are often subjected to high working pressures such that regular monitoring may be required to track the health and performance of the pump components.

The early detection of any possible failure mode in such pump components is commonly desired to ensure pump efficiency and to prevent excessive downtime due to unplanned maintenance. For example, the detection of a failure mode, such as leakage, at an early stage may be critical to pump health. In the field, however, a common response to the detection of a leakage may be to replace all of the valves to save downtime while, on the other hand, incurring increases in other costs related to valve replacement. U.S. Pat. No. 7,401,500 discloses a positive displacement pump monitor, which employs an acoustic sensor to merely determine an existence of a leak, but fails to determine the location of the leak.

SUMMARY

In accordance with an aspect of the disclosure, a method for detecting a leak in a pump comprises: monitoring discharge pressure time domain signals of the pump; monitoring piston position time domain signals for each piston of a plurality of pistons; filtering the monitored discharge pressure time domain signals and the monitored piston position time domain signals of each piston of the plurality of pistons via a band pass filter; determining, at each pump revolution for each piston of the plurality of pistons, a sum of product of the filtered discharge pressure time domain signals and the filtered piston position time domain signals; determine, at each pump revolution for each piston of the plurality of pistons, an absolute value of each sum; determining, at each pump revolution, a largest absolute value of the determined absolute values; determining a corresponding piston of the plurality of pistons associated with the largest absolute value; and determining a cylinder of the pump associated with the determined corresponding piston as leaking.

In accordance with another aspect of the disclosure, a failure location detection system for a pump may comprise a discharge pressure sensor operatively disposed in a discharge manifold of the pump. The discharge pressure sensor may be configured to monitor and transmit discharge pressure time domain signals associated with the discharge manifold. A plurality of piston sensors may be configured to monitor and transmit piston position time domain signals for each piston of a plurality of pistons of the pump. Each piston sensor may be operatively associated with a corresponding piston of the plurality of pistons. A processor may be in operative communication with the discharge pressure sensor and the plurality of piston sensors. The processor may be configured to receive the discharge pressure time domain signals and the piston position time domain signals for each pump piston of the plurality of pistons for determining which cylinder of a plurality of cylinders is leaking by identifying a corresponding cylinder associated with one of the pistons of the plurality of pistons associated with a largest absolute value. The largest absolute value may be determined from absolute values of each sum of product, determined for each piston of the plurality of pistons during a pump revolution, of the discharge pressure time domain signals and the piston position time domain signals.

In accordance with yet another aspect of the disclosure, a pump may comprise a plurality of cylinders disposed in fluid communication between a suction manifold and a discharge manifold. Each cylinder of the plurality of cylinders may comprise a housing. Each piston of a plurality of pistons may be slidably disposed in the housing of a corresponding cylinder of the plurality of cylinders. A discharge pressure sensor may be disposed in the discharge manifold and may be configured to monitor and transmit discharge pressure time domain signals associated with the discharge manifold. Each piston sensor of a plurality of piston sensors may be operatively associated with a corresponding piston of the plurality of pistons. Each piston sensor of the plurality of piston sensors may be configured to monitor and transmit piston position time domain signals associated with corresponding pistons. A processor may be in operative communication with the discharge pressure sensor and the plurality of piston sensors. The processor may be configured to: receive discharge pressure time domain signals form the discharge pressure sensor; receive piston position time domain signals from each piston sensor of the plurality of piston sensors; filter the received discharge pressure time domain signals and the received piston position time domain signals from each piston sensor of the plurality of piston sensors; determine, at each pump revolution for each piston of the plurality of pistons, a sum of product of the filtered discharge pressure time domain signals and the filtered piston position time domain signals; determine, at each pump revolution for each piston of the plurality of pistons, an absolute value of each sum; determine, at each pump revolution, a largest absolute value of the determined absolute values; determine a corresponding piston of the plurality of pistons associated with the largest absolute value; and determine a corresponding cylinder of the plurality of cylinders associated with the determined corresponding piston of the plurality of pistons as leaking.

These and other aspects and features of the present disclosure will be more readily understood upon reading the following detailed description when taken in conjunction with the accompanying drawings. Aspects of different embodiments herein described can be combined with or substituted by one another.

DETAILED DESCRIPTION

Figure 1:
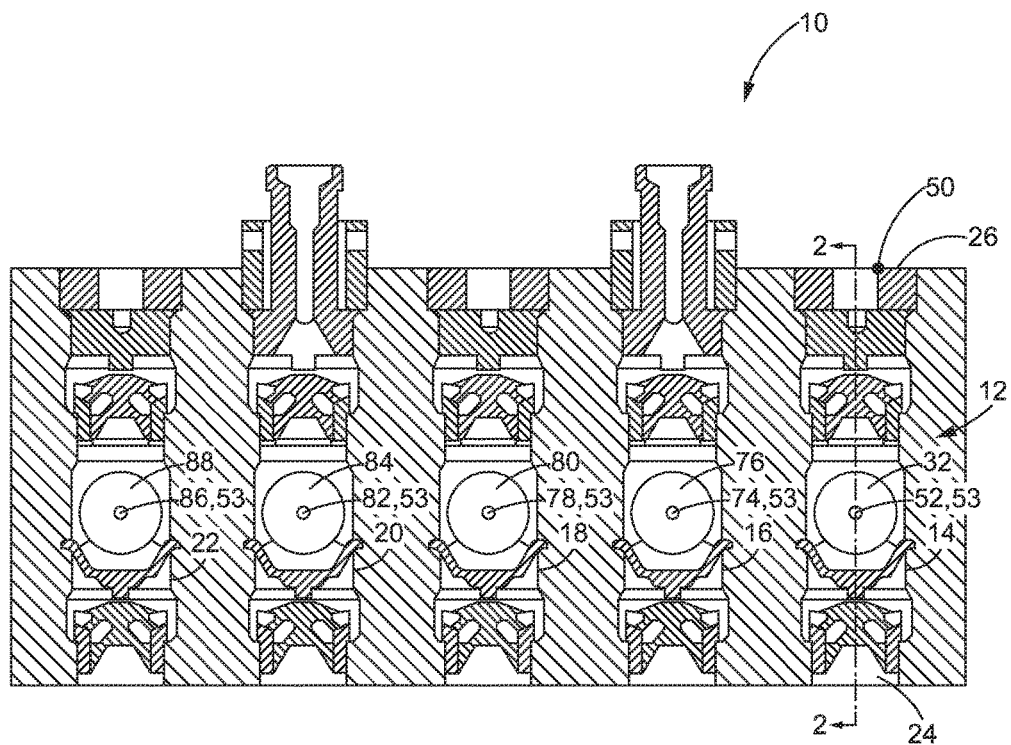
FIG. 1 is a cross-sectional view of an exemplary pump, in accordance with an embodiment of the present disclosure.

Referring now to FIG. 1, an exemplary pump constructed in accordance with the present disclosure is generally referred to by reference numeral 10. The pump 10 may be a positive displacement pump and may be utilized in various industrial settings such as, but not limited to, hydraulic fracturing, cementing, coil tubing, and water jet cutting. The pump 10 includes a plurality of cylinders 12, which may include a first cylinder 14, a second cylinder 16, a third cylinder 18, a fourth cylinder 20, and a fifth cylinder 22. The pump 10 further includes a suction manifold 24 and a discharge manifold 26 such that the plurality of cylinders 12 are operatively disposed in fluid communication therebetween.

As each cylinder of the plurality of cylinders 12 is substantially similar to each other, for simplicity, the components of only one cylinder, such as the first cylinder 14 for example, will be described in greater detail with reference to FIG. 2. The first cylinder 14 of the pump 10 includes a housing 28 and a chamber 30 disposed in the housing 28. A first piston 32 is slidably disposed in the housing 28 of the first cylinder for reciprocal motion toward and away from the chamber 30. The first cylinder 14 further includes an input 34 in fluid communication with the chamber 30 via a suction valve 36. The suction valve 36 controls the flow of fluid through the input 34, via the suction manifold 24, into the chamber 30 as the first piston 32 reciprocates.

The first cylinder 14 also includes an output 38 in fluid communication with the chamber 30 via a discharge valve 40. The discharge valve 40 controls the flow of fluid from the chamber 30 outwardly to the discharge manifold 26, via the output 38, as the first piston 32 reciprocates. The reciprocating motion of the first piston 32 changes the volume of the fluid in the chamber 30. In particular, when the first piston 32 reciprocates away from the chamber 30 a drop in pressure is created within the chamber 30 such that the discharge valve 40 closes and the suction valve 36 opens allowing fluid to flow through the input 34 to the chamber 30. On the other hand, when the first piston 32 reciprocates towards the chamber 30 pressure is increased such that the suction valve 36 closes and the discharge valve 40 opens forcing fluid to flow from the chamber 30 outwardly through the discharge valve 40 to the discharge manifold 26 via the output 38. It should be understood that the input of each cylinder of the plurality of cylinders 12 is in fluid communication with the suction manifold 24 and that the output of each cylinder of the plurality of cylinders 12 is in fluid communication with the discharge manifold 26.

Moreover, the pump 10 includes a power source 42 disposed in a power section 44. The power source 42 may be any type of power source such as, but not limited to, engines, gas turbine engines, generator sets, and other power sources well known in the industry. The power source 42 is operatively coupled to a crankshaft 46 via components such as a transmission and a drive shaft (both not shown). The crankshaft 46 is operatively coupled to the first piston 32 via other components such as a connected rod (not shown) such that the power source 42 drives the reciprocating motion of the first piston 32 via such operative couplings. It should be understood that the power source 42 is configured, via similar operative couplings, to drive the piston of each cylinder of the plurality of cylinders 12 such that the reciprocal motion of each piston is staggered.

Figure 3:
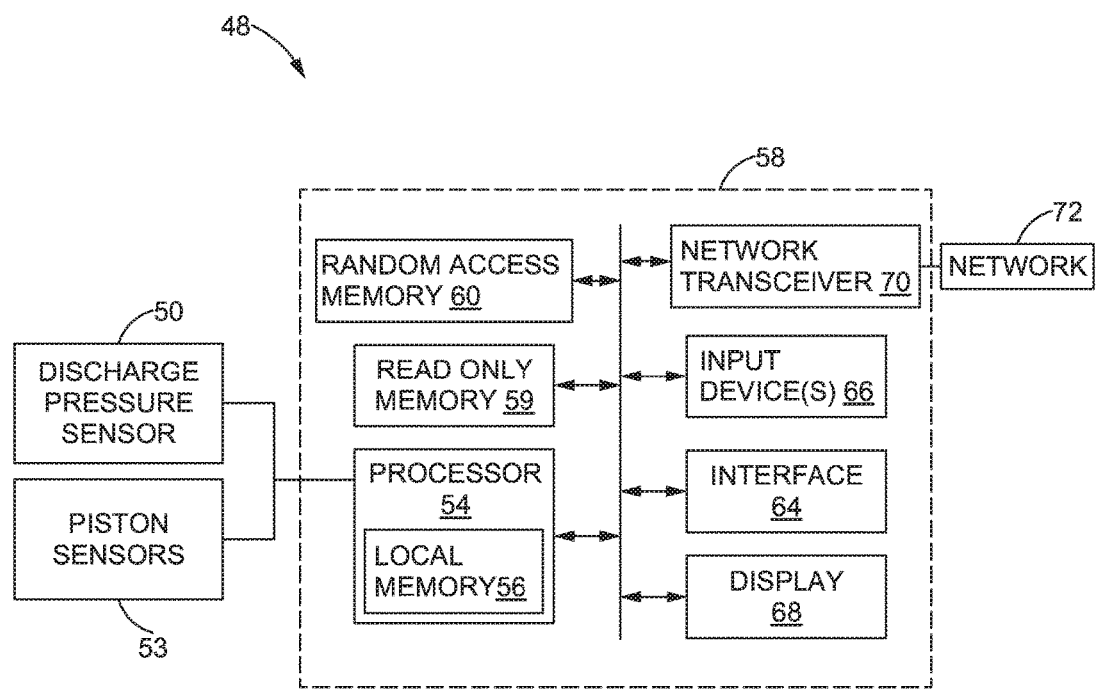
FIG. 3 is a schematic view of a fault detection system of the exemplary pump in FIGS. 1 and 2, in accordance with an embodiment of the present disclosure.

With reference to FIG. 3, the pump 10 includes a failure location detection system 48. The failure location detection system 48 includes a discharge pressure sensor 50, a first piston sensor 52 of a plurality of piston sensors 53, and a processor 54. The processor 54 is operatively coupled to a local memory 56 and may be part of a computing device 58. The processor 54 may be implemented by one or more microprocessors or controllers from any desired family or manufacturer. The processor 54 may be operatively coupled with a main memory including a read-only memory 59 and a random access memory 60 via a bus 62. The random access memory 60 may be implemented by Synchronous Dynamic Random Access Memory (SDRAM), Dynamic Random Access Memory (DRAM), RAMBUS Dynamic Random Access Memory (RDRAM) and/or any other type of random access memory device. The read-only memory 59 may be implemented by a hard drive, flash memory and/or any other desired type of memory device.

The computing device 58 may also include an interface 64, which may be implemented by any type of interface standard, such as, for example, an Ethernet interface, a universal serial bus (USB), and/or a Peripheral Component Interconnect (PCI) express interface. One or more input devices 66 are operatively coupled to the interface 64. The input device(s) 66 permit a user to enter data and commands into the processor 54 and may be implemented by, for example, a keyboard, a mouse, a track-pad, a trackball, and/or a voice recognition system.

A display 68 may also be operatively coupled to the interface 64. The display 68 may be implemented by, for example, one or more display devices for associated data (e.g., a liquid crystal display, a cathode ray tube (CRT) display, a monitor, etc.)

Further, the computing device 58 may include one or more network transceivers 70 for connecting to a network 72, such as the Internet, a WLAN, a LAN, a personal network, or any other network for connecting the computing device 58 to one or more other computers or network capable devices.

The computing device 58 may be used to execute machine readable instructions. For example, the computing device 58 may execute machine readable instructions to perform the exemplary sequence shown in the flow chart of FIG. 13, described in more detail below. In such examples, the machine readable instructions comprise a program for execution by a processor such as the processor 54 shown in example computing device 58. The program may be embodied in software stored on a tangible computer readable medium such as a CD-ROM, a floppy disk, a hard drive, a digital versatile disk (DVD), Blu-Ray™ disk, or a memory associated with the processor 54, but the entire program and/or parts thereof could alternatively be executed by a device other than the processor 54 and/or embodied in firmware or dedicated hardware.

The failure location detection system 48 is configured to determine which cylinder of the plurality of cylinders 12 has a failure, such as a leak, and to determine location of the leak in the faulty cylinder, for example whether the leak is located at the discharge valve 40 or the suction valve 36. For example, once a particular cylinder, the first cylinder 14 for example, is determined to include a leak, the change in discharge pressure is monitored, when the first piston 32 compresses (piston displacement increases), to determine the location of the leak. If the discharge pressure increases when the first piston 32 compresses, then the location of the leak is at the discharge valve 40 (e.g. the piston displacement has the same phase as the discharge pressure). If the discharge pressure decreases when the first piston 32 compresses, then the location of the leak is at the suction valve 36 (e.g. the piston displacement has the opposite phase as the discharge pressure).

Figure 2:
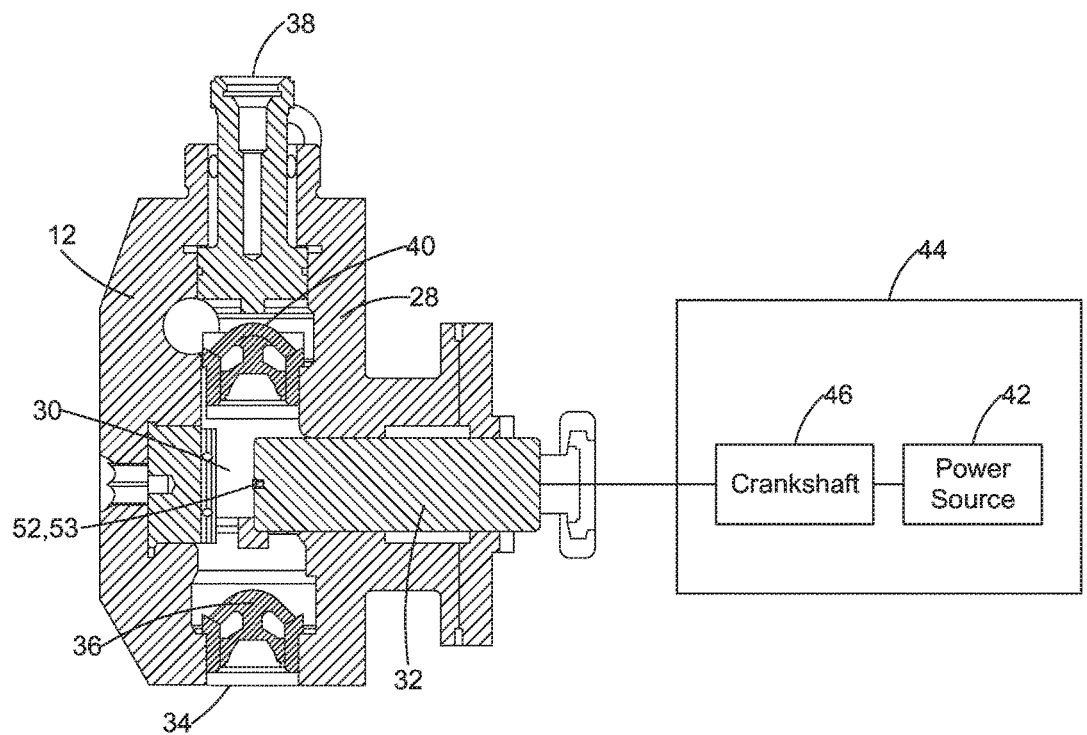
FIG. 2 is a partial cross-sectional view of the exemplary pump in FIG. 1 taken along line 2-2 with a power section of the exemplary pump illustrated diagrammatically, in accordance with an embodiment of the present disclosure.

With reference to FIGS. 1-3, the discharge pressure sensor 50 and the first piston sensor 52 of the plurality of piston sensors 53 are in operative communication with the processor 54. In some embodiments, the processor 54 is located onsite and may be disposed in various locations on the pump 10 or may be located locally at other onsite areas. In other embodiments, the processor 54 may be located offsite. The discharge pressure sensor 50 is configured to monitor the pressure associated with the discharge manifold 26 and to transmit corresponding discharge pressure signals, as time domain signals for example, to the processor 54. In an embodiment, the discharge pressure sensor 50 is disposed in the discharge manifold 26. While the discharge pressure sensor 50 is exemplary illustrated in FIG. 1 as being disposed in the discharge manifold 26 proximate the first cylinder 14 of the plurality of cylinders 12, it is to be understood that the discharge pressure sensor 50 may be disposed in any appropriate location in the discharge manifold 26.

The first piston sensor 52 is configured to monitor the position of the first piston 32 and to transmit corresponding first piston position signals to the processor 54. In some embodiments, the first piston sensor 52 is disposed on the first piston 32 or in the first piston 32. In some other embodiments, the first piston sensor 52 is disposed in the housing 28. Moreover, it should be understood that each cylinder of the plurality of cylinders 12 is associated with a corresponding piston sensor of the plurality of piston sensors 53 for monitoring piston positions such that a second piston sensor 74 is associated with a second piston 76 of the second cylinder 16; a third piston sensor 78 is associated with a third piston 80 of the third cylinder 18; a fourth piston sensor 82 is associated with a fourth piston 84 of the fourth cylinder 20; and a fifth piston sensor 86 is associated with a fifth piston 88 of the fifth cylinder 22. Similarly to the first piston sensor 52, the second through fifth piston sensors 74, 78, 82, 86 are in operative communication with the processor 54 and are configured to monitor the position of the second through fifth pistons 76, 80, 84, 88, respectively, and to transmit corresponding second through fifth piston position signals, such as time domain signals, to the processor 54, respectively. The first through fifth piston sensors 52, 74, 78, 82, 86 may be any sensor configured to monitor the position of the first through fifth pistons 32, 76, 80, 84, 88, respectively, such as, but not limited to, proximity switches, accelerometers, and other appropriate sensors.

Further, the processor 54 is configured to receive the corresponding first through fifth piston position time domain signals and the discharge pressure time domain signals. The processor 54 is further configured to filter the first through fifth piston position time domain signals and the discharge pressure time domain signals via a band pass filter. The processor 54 is also configured to, for each pump revolution of the pump 10, determine the first sum of the product of the filtered first piston position time domain signals and the filtered discharge pressure time domain signals. Determination of the first sum of the product of the filtered first piston position time domain signals and the filtered discharge pressure time domain signals includes a first step and a second step. The first step includes multiplying the filtered discharge pressure time domain signals and the filtered piston position time domain signals at predetermined time intervals during the pump revolution to produce corresponding product terms. The second step includes adding all of the corresponding product terms together. Similarly, the processor 54 is configured to determine the second through fifth sum of the product of each of the filtered second through fifth piston position time domain signals, respectively, and the filtered discharge pressure time domain signals, for each pump revolution of the pump 10.

In order to determine which cylinder of the plurality of cylinders 12 includes a leak, the processor 54 is further configured to, at each pump revolution of the pump 10 for each piston of the plurality of pistons 53, determine an absolute value of the first through fifth sums. The processor 54 is further configured to then determine a largest absolute value of the determined absolute values. The processor 54 is configured to determine a corresponding piston of the plurality of pistons 53 associated with the largest absolute value. The processor 54 is configured to determine that a cylinder of the pump 10 associated with the determined corresponding piston includes a leak (e.g. the cylinder associated with the largest absolute value is the cylinder that includes a leak). With the leak-identified cylinder detected, the processor 54 is configured to determine the sign of the largest absolute value in order to determine the leak location. The processor 54 is configured to determine a sign value of the largest absolute value such that determination of the sign value being a first sign detects or identifies a discharge leak at the discharge valve 40 and that determination of the sign value being a second sign, opposite to the first sign, detects or identifies a suction leak at the suction valve 36. In an embodiment, the first sign is positive and the second sign is negative.

Figure 4:
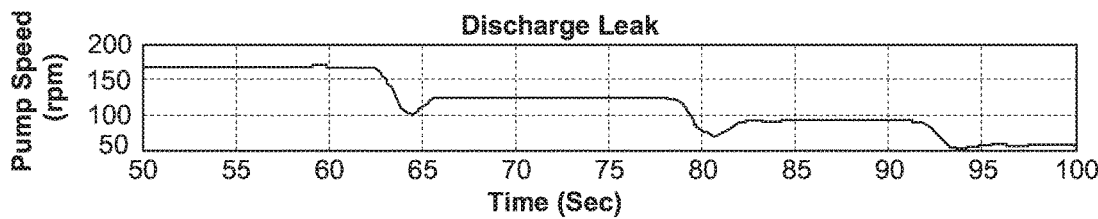
FIG. 4 is an exemplary graph illustrating pump speed versus time, in accordance with an embodiment of the present disclosure.
Figure 5:
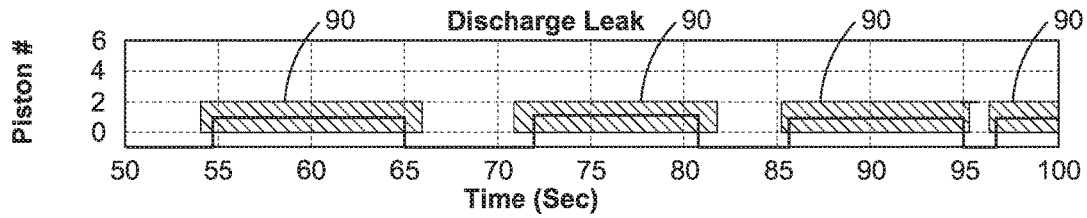
FIG. 5 is an exemplary graph illustrating piston number versus time, in accordance with an embodiment of the present disclosure.
Figure 6:
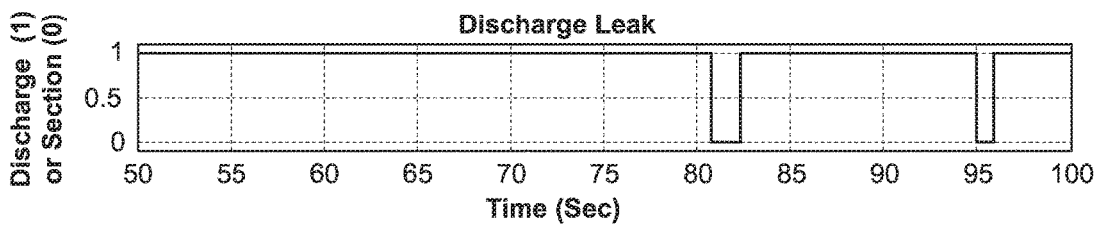
FIG. 6 is an exemplary graph illustrating discharge valve (1) or suction valve (0) versus time, in accordance with an embodiment of the present disclosure.

With reference to FIGS. 4-6, as viewed together, exemplary leak location detection results illustrate the detection or identification of a discharge leak in the discharge valve 40 of the first cylinder 14 that corresponds to the first piston 32. FIG. 4 illustrates the pump speed in units of revolutions per minute (RPM) versus time in units of seconds (sec). FIG. 5 illustrates the piston number versus time in units of seconds. FIG. 6 illustrates the discharge valve 40 or the suction valve 36 versus time in units of seconds. As such, a plot line of (1) depicts the sign value of the largest absolute value being a first sign (e.g. positive sign represented as (1) illustrating the displacement of the first piston 32 having the same phase as the discharge pressure) and a plot line of (0) depicts the sign value of the largest absolute value being a second sign (e.g.

negative sign represented as (0) illustrating the displacement of the first piston 32 having the opposite phase as the discharge pressure). A plot line of (1) may correspond to the identification of a discharge leak at the discharge valve 40 and a plot line of (0) may correspond to the identification of a suction leak at the suction valve 36.

For example, the first detection windows 90 in FIG. 5 highlight the first piston 32 to illustrate the determination of the largest absolute value of the determined absolute values being associated with the first piston 32 of the first cylinder 14. The first detection windows 90 may be compared with the pump speed detection results illustrated in FIG. 4 to identify corresponding time frames of when the pump speed is stabilized (e.g. when the curve in FIG. 4 is substantially horizontal), such as between the times of approximately 55 seconds and 63 seconds, between the times of approximately 72 seconds and 81 seconds, and between the times of approximately 86 seconds and 94 seconds. With further comparison to FIG. 6, the plot line depicts a (1) within the corresponding time frames identified via FIGS. 4 and 5, which indicates a detection of a discharge leak at the discharge valve 40.

Figure 7:
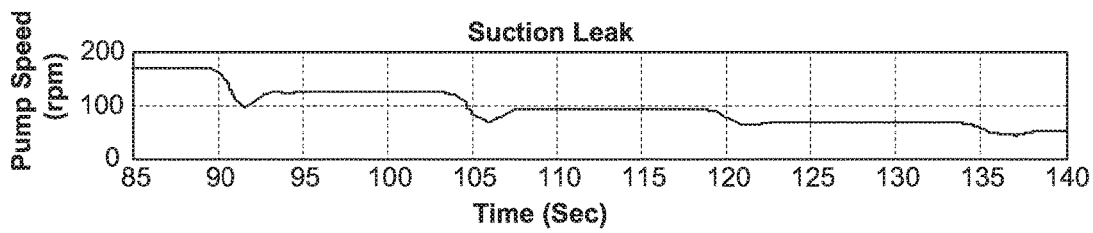
FIG. 7 is an exemplary graph illustrating pump speed versus time, in accordance with an embodiment of the present disclosure.
Figure 8:
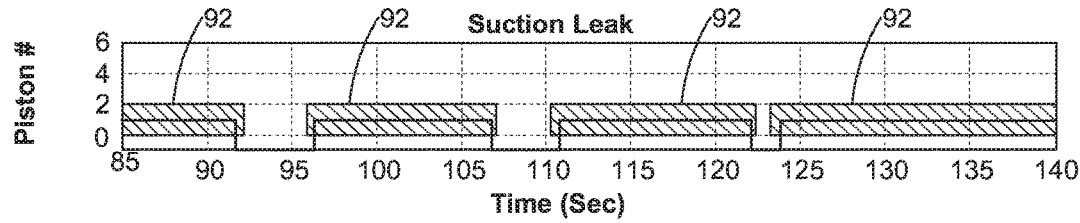
FIG. 8 is an exemplary graph illustrating piston number versus time k, in accordance with an embodiment of the present disclosure.
Figure 9:
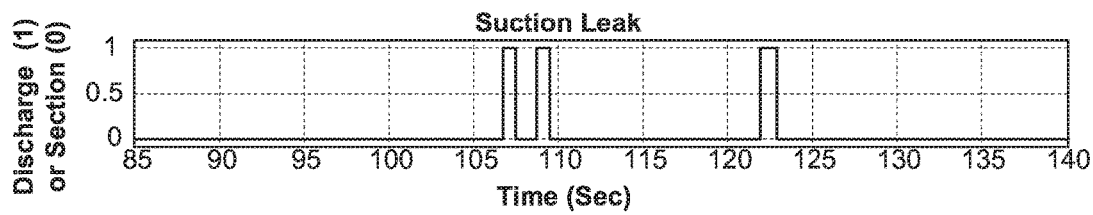
FIG. 9 is an exemplary graph illustrating discharge valve (1) or suction valve (0) versus time, in accordance with an embodiment of the present disclosure.

With reference to FIGS. 7-9, as viewed together, exemplary leak location detection results illustrate, on the other hand, the detection or identification of a suction leak in the suction valve 36 of the first cylinder 14 that corresponds to the first piston 32. FIG. 7 illustrates the pump speed in units of RPM versus time in units of seconds. FIG. 8 illustrates the piston number versus time in units of seconds. FIG. 9 illustrates the discharge valve 40 or the suction valve 36 versus time in units of seconds. As such, a plot line of (1) depicts the sign value of the largest absolute value being a first sign (e.g. positive sign represented as (1) illustrating the displacement of the first piston 32 having the same phase as the discharge pressure) and a plot line of (0) depicts the sign value of the largest absolute value being a second sign (e.g. negative sign represented as (0) illustrating the displacement of the first piston 32 having the opposite phase as the discharge pressure). A plot line of (1) may correspond to the identification of a discharge leak at the discharge valve 40 and a plot line of (0) may correspond to the identification of a suction leak at the suction valve 36.

For example, the second detection windows 92 in FIG. 8 highlight the first piston 32 to illustrate the determination of the largest absolute value of the determined absolute values being associated with the first piston 32 of the first cylinder 14. The second detection windows 92 may be compared with the pump speed detection results illustrated in FIG. 7 to identify corresponding time frames of when the pump speed is stabilized (e.g. when the curve in FIG. 7 is substantially horizontal), such as between the times of approximately 85 seconds and 92 seconds, between the times of approximately 96 seconds and 104 seconds, between the times of approximately 111 seconds and 119 seconds, and between the times of approximately 124 seconds and 134 seconds. With further comparison to FIG. 9, the plot line depicts a (0) within the corresponding time frames identified via FIGS. 7 and 8, which indicates a detection of a suction leak at the suction valve 36.

INDUSTRIAL APPLICABILITY

In general, the present disclosure may find applicability with positive displacement pumps utilized in high pressure applications for any number of industrial settings such as, but not limited to, hydraulic fracturing, cementing, coil tubing, and water jet cutting. As a non-limiting example, the pump 10 may be a fracturing rig pump operating at a wellbore site. By utilizing the systems and methods disclosed herein, the failure location detection system 48 can be employed to detect which cylinder of a plurality of cylinders has a leak and the location of the leak in the detected cylinder, which may result in less unplanned downtime due to maintenance and, in turn, may lead to increased pump life.

For example, with pump 10 utilized at the wellbore site, the processor 54 of the failure location detection system 48 may be disposed on the pump 10 or located in the nearby vicinity of the pump 10 at the site. The close proximity of the processor 54 to the pump 10 may facilitate faster detection of a leaking cylinder in the pump 10 and may determine the location of the leak in the leaking cylinder (e.g. discharge valve leak or suction valve leak), which may provide real-time analysis, as opposed to offsite, back-office diagnostics that sometimes involve delayed analysis. Moreover, by determining the location of the leak in the leaking cylinder, the processor 54 of the failure location detection system 48 may provide more accurate diagnostics such that only a leaking discharge valve or a leaking suction valve may be replaced as opposed to other detection systems that merely identify the leaking cylinder, but not the location of the leak, and which often involve replacing both the discharge valve and the suction valve in efforts to reduce downtime as a tradeoff for the costs related to additional replacement parts.

Figure 10:
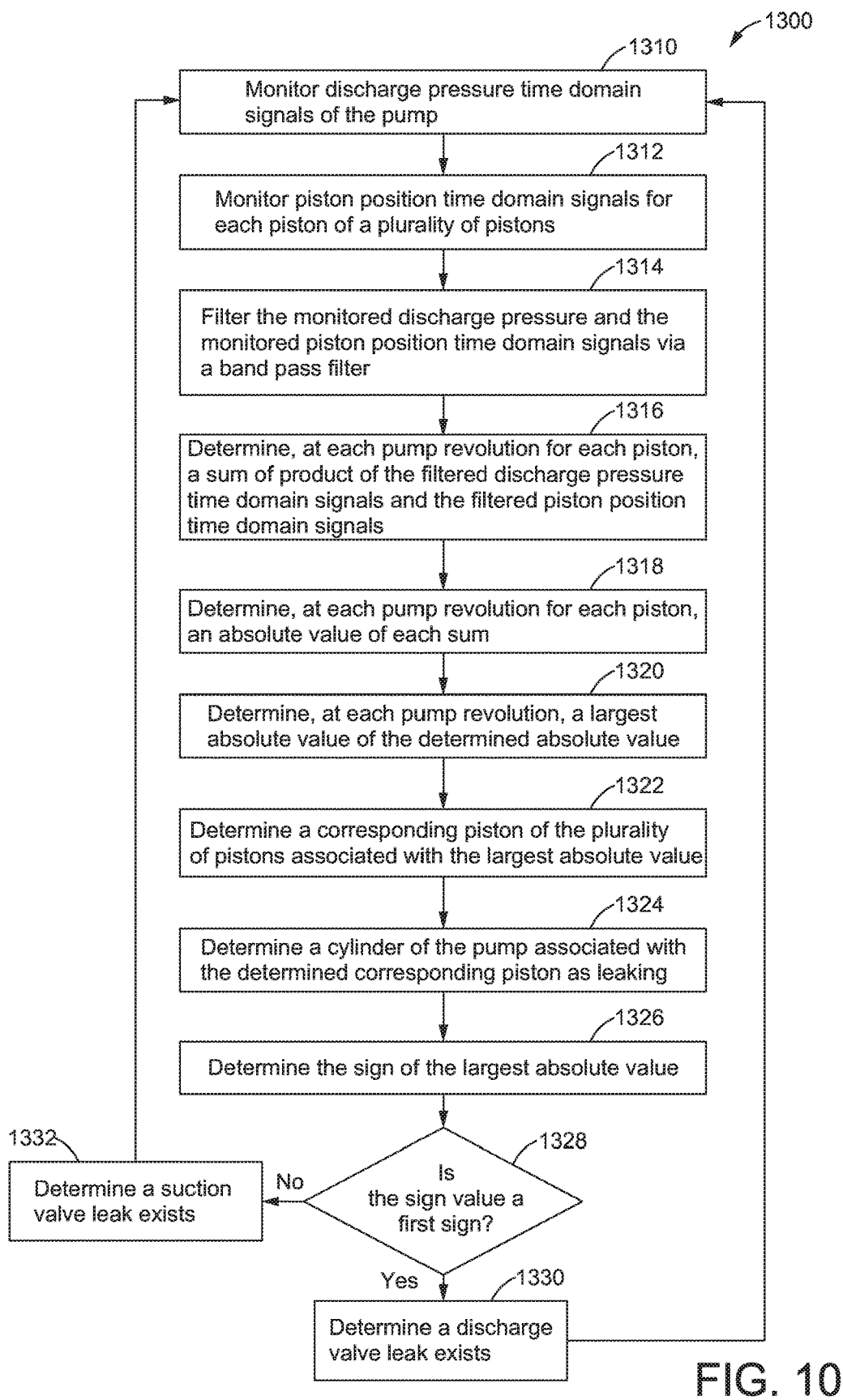
FIG. 10 is an exemplary flow chart illustrating a sample sequence which may be practiced in accordance with an embodiment of the present disclosure.

FIG. 10 illustrates a flow chart 1300 of a sample sequence of blocks which may be performed to detect which cylinder of a plurality of cylinders includes a leak and to detect the location of the leak in the detected cylinder. Block 1310 illustrates monitoring the discharge pressure via the discharge pressure sensor 50. Block 1312 illustrates monitoring the piston positions of each piston 32, 76, 80, 84, 88 via the piston sensors 52, 74, 78, 82, 86, respectively. The discharge pressure sensor 50 and the piston sensors 52, 74, 78, 82, 86 transmit discharge pressure time domain signals and piston position time domain signals for each piston 32, 76, 80, 84, 88, respectively, to the processor 54. As illustrated in block 1314, the processor 54 receives the discharge pressure time domain signals and the piston position time domain signals for each piston 32, 76, 80, 84, 88 and filters the signals via a band pass filter for removing noise from the signals.

Block 1316 illustrates the processor 54 determining, at each pump revolution for each piston 32, 76, 80, 84, 88, the sum of the product of the filtered piston position time domain signals and the filtered discharge time domain signals. As illustrated at block 1318, the processor 54 determines, at each pump revolution for each piston, an absolute value of each sum. At block 1320, the processor 54 determines, at each pump revolution, a largest absolute value of the determined absolute values. Block 1322 illustrates the processor 54 determining a corresponding piston of the plurality of pistons 53 associated with the largest absolute value. At block 1324, the processor 54 determines a cylinder of the pump associated with the determined corresponding piston as leaking. For example, the first piston 32 is associated with the first cylinder 14. As illustrated at block 1326, the processor 54 determines the sign of the largest absolute value to determine the location of the leak in the determined cylinder.

At decision block 1328, the processor 54 determines whether the sign is a first sign such that the processor 54 determines a discharge valve leak exists in the determined cylinder when the sign is a first sign (such as a positive sign which may be represented graphically as a (1)), as illustrated at block 1330, and determines a suction valve leak exists in the determined cylinder when the sign is not the first sign (e.g. the sign is a second sign that is opposite the first sign such as a negative sign which may be represented graphically as a (0)), as illustrated at block 1332. After the location of the leak is determined, the discharge pressure sensor 50 and the piston sensors 52, 74, 78, 82, 86 continue monitoring and transmitting corresponding signals to the processor 54, as illustrated by the return to block 1310.

What is claimed is:

1. A method for detecting a leak in a pump, the method comprising:
   monitoring discharge pressure time domain signals of the pump;
   monitoring piston position time domain signals for each piston of a plurality of pistons;
   filtering the monitored discharge pressure time domain signals and the monitored piston position time domain signals of each piston of the plurality of pistons via a band pass filter;
   determining, at each pump revolution for each piston of the plurality of pistons, a sum of a product between the filtered discharge pressure time domain signals and the filtered piston position time domain signals;
   determining, at each pump revolution for each piston of the plurality of pistons, an absolute value of each sum;
   determining, at each pump revolution, a largest absolute value of the determined absolute values;
   determining a corresponding piston of the plurality of pistons associated with the largest absolute value; and
   determining a cylinder of the pump associated with the determined corresponding piston as leaking.

2. The method of claim 1, wherein determining the sum of the product between the filtered discharge pressure time domain signals and the filtered piston position time domain signals includes a first step of multiplying the filtered discharge pressure time domain signals and the filtered piston position time domain signals at predetermined time intervals during the pump revolution to produce corresponding product terms, and includes a second step of summing all of the corresponding product terms.

3. The method of claim 1, further comprising determining a sign value of a piston displacement associated with the largest absolute value wherein determination of the sign value being a first sign identifies a discharge valve leak in the cylinder and determination of the sign value being a second sign identifies a suction valve leak in the cylinder.

4. The method of claim 3, wherein the first sign is positive and the second sign is negative.

5. The method of claim 4, wherein monitoring discharge pressure time domain signals of the pump further comprises monitoring discharge pressure time domain signals of the pump associated with a discharge manifold of the pump.

6. The method of claim 5, wherein the plurality of pistons includes a first through a fifth piston and, at each pump revolution for each of the first through fifth pistons of the plurality of pistons, a corresponding first through fifth sum of the product between the filtered discharge pressure time domain signals and the filtered piston position time domain signals is determined.

7. A failure location detection system for a pump, the failure location detection system comprising:
   a discharge pressure sensor operatively disposed in a discharge manifold of the pump, the discharge pressure sensor configured to monitor and transmit discharge pressure time domain signals associated with the discharge manifold;
   a plurality of piston sensors configured to monitor and transmit piston position time domain signals for each piston of a plurality of pistons of the pump, each piston sensor operatively associated with a corresponding piston of the plurality of pistons; and
   a processor in operative communication with the discharge pressure sensor and the plurality of piston sensors, the processor configured to receive the discharge pressure time domain signals and the piston position time domain signals for each piston of the plurality of pistons for determining which cylinder of a plurality of cylinders is leaking by identifying a corresponding cylinder associated with one of the pistons of the plurality of pistons associated with a largest absolute value, the largest absolute value determined from an absolute value, determined for each piston of the plurality of pistons during a pump revolution, of a sum of a product between the discharge pressure time domain signals and the piston position time domain signals.

8. The failure location detection system of claim 7, wherein each sum of product of the discharge pressure time domain signals and the piston position time domain signals is determined by a first step of multiplying the filtered discharge pressure time domain signals and the filtered piston position time domain signals at predetermined time intervals during the pump revolution to produce corresponding product terms, and by a second step of adding all of the corresponding product terms.

9. The failure location detection system of claim 7, wherein the processor is further configured to determine leak location in the corresponding cylinder by determining a sign value of a piston displacement associated with the largest absolute value wherein the sign value being a first sign identifies a discharge valve leak in the corresponding cylinder and determination of the sign value being a second sign identifies a suction valve leak in the corresponding cylinder.

10. The failure location detection system of claim 9, wherein the first sign is positive and the second sign is negative.

11. The failure location detection system of claim 10, wherein the processor is further configured to filter, via a band pass filter, the received discharge pressure domain signals and the piston position time domain signals for each piston of the plurality of pistons.

12. The failure location detection system of claim 11, wherein the plurality of piston sensors includes first through fifth piston sensors disposed, on a corresponding first through fifth pistons of the plurality of pistons associated therewith.

13. A pump, comprising:
   a plurality of cylinders disposed in fluid communication between a suction manifold and a discharge manifold, each cylinder of the plurality of cylinders comprising a housing;
   a plurality of pistons, each piston of the plurality of pistons slidably disposed in the housing of a corresponding cylinder of the plurality of cylinders;
   a discharge pressure sensor disposed in the discharge manifold and configured to monitor and transmit discharge pressure time domain signals associated with the discharge manifold;
   a plurality of piston sensors, each piston sensor of the plurality of piston sensors operatively associated with a corresponding piston of the plurality of pistons, each piston sensor of the plurality of piston sensors configured to monitor and transmit piston positon time domain signals associated with corresponding pistons; and a processor in operative communication with the discharge pressure sensor and the plurality of piston sensors, the processor configured to:

receive discharge pressure time domain signals from the discharge pressure sensor;

receive piston position time domain signals from each piston sensor of the plurality of piston sensors;

filter the received discharge pressure time domain signals and the received piston position time domain signals from each piston sensor of the plurality of piston sensors;

determine, at each pump revolution for each piston of the plurality of pistons, a sum of a product between the filtered discharge pressure time domain signals and the filtered piston position time domain signals;

determine, at each pump revolution for each piston of the plurality of pistons, an absolute value of each sum;

determine, at each pump revolution, a largest absolute value of the determined absolute values;

determine a corresponding piston of the plurality of pistons associated with the largest absolute value; and determine a corresponding cylinder of the plurality of cylinders associated with the determined corresponding piston of the plurality of pistons as leaking.

14. The pump of claim 13, wherein the processor is further configured to determine the sum of the product between the filtered discharge pressure time domain signals and the filtered piston position time domain signals by a first step of multiplying the filtered discharge pressure time domain signals and the filtered piston position time domain signals at predetermined time intervals during the pump revolution to produce corresponding product terms, and by a second step of summing all of the corresponding product terms.

15. The pump of claim 13, wherein the processor is further configured to determine a sign value of a piston displacement associated with the largest absolute value wherein determination of the sign value being a first sign identifies a discharge valve leak in the determined corresponding cylinder of the plurality of cylinders and determination of the sign value being a second sign identifies a suction valve leak in the determined corresponding cylinder of the plurality of cylinders.

16. The pump of claim 15, wherein the first sign is positive and the second sign is negative.

17. The pump of claim 16, wherein each piston sensor of the plurality of piston sensors is disposed on corresponding pistons of the plurality of pistons.

18. The pump of claim 16, wherein each piston sensor of the plurality of piston sensors is disposed in the housing of corresponding cylinders of the plurality of cylinders.

19. The pump of claim 16, wherein the plurality of piston sensors comprises first through fifth piston sensors, each associated with a first through fifth piston of the plurality of pistons.

20. The pump of claim 16, wherein the plurality of piston sensors are one of proximity switches and accelerometers.

* * * * *